Patented Oct. 3, 1950

2,524,309

UNITED STATES PATENT OFFICE 2,524,309

ANTIFOAMERS FOR PROTEINACEOUS SOLUTIONS

Bernard B. Coyne, Seattle, Wash., assignor to American Marietta Co., Seattle, Wash.

No Drawing. Application November 12, 1947, Serial No. 785,547

5 Claims. (Cl. 252—358)

This invention relates to antifoamers for proteinaceous solutions and, more particularly, is the provision of an anti-foamer for addition to protein type adhesives, and the like.

It is well known that with certain of the protein-base adhesives, in which casein, soya meal, animal blood, egg albumen, and other proteins are used, excessive foaming occurs when the glues, which are normally compounded in the dry state, are prepared in an aqueous solution for application. Such is particularly true in the plywood industry, where substantial quantities of glue are prepared in a single batch, largely by mechanical mixing means, and are conveyed mechanically, as through pipes under the influence of pumps or other pressure devices, to the glue spreader. The problem is further aggravated by the action of the spreader, which causes additional agitation and foaming. The presence of foam in the glue tends to increase falsely the viscosity and make the glue less mobile and less cohesive. Foam also impairs the spreading qualities and reduces uniformity of the spread to such an extent that plywood assembled with foamy glue often has an unduly large percentage of improperly glued joints. Similar foam conditions prevail in the case of protein paints, protein plastics, protein-containing fiber slurries, protein coatings, protein sizings, and result in inferior results to the users of such materials.

In the prior art, many attempts have been made to solve this problem, but for one reason or another, the various proposed solutions are not acceptable. For example, ether has been used but its inflammable characteristics create a most hazardous situation. Most oils that have been used produce an undesirable oil-spotting condition, particularly in the case of sizings and coatings in the paper industry. Carbon tetrachloride and ethylene dichloride have been proposed, but without marked success because of the effect upon viscosity and cohesiveness. Soluble aliphatic alcohols have been employed, but it is believed that they, as well as most of the other materials, are not as inexpensive or readily available as a suitable anti-foamer should be.

Having in mind these and other objections to the prior practices, I have developed a material that has for its prime object the abatement of foam formation in proteinaceous solutions, without materially affecting the chemical or physical properties of the suspension or dispersion.

Another, and more specific object, is the abatement of foam in proteinaceous adhesive suspensions and dispersions without affecting the adhesive qualities thereof, but at the same time enhancing the flowing characteristics.

Still another object of the invention has been the provision of a process for abating foaming in proteinaceous dispersions and suspensions which may be inexpensively and effectively practiced with readily available, cheap materials and by relatively unskilled workmen and without requiring a high degree of supervision.

A further object of the invention is to provide a process for abating foam in proteinaceous solutions without seriously changing the specific gravity of the dispersion or suspension.

One other object has been the provision of a process of abating foam in proteinaceous types of adhesives, paints, coatings, sizings, and slurries.

Other and more specific objects will be more apparent from the following description of my invention and the claims drawn thereto.

Throughout this specification certain terms appear which I intend to have rather definite meanings. In speaking of "proteinaceous solutions" I have in mind suspensions, dispersions or colloidal solutions, in which there is a protein that appears to cause, when uncontrolled, unnecessary and undesirable foaming. "Foaming" refers, in such a solution, to the presence of small and large bubbles in undesirable quantities. "Stearate" is the word I prefer to employ to designate a class of water-insoluble stearates and their homologues that I have found efficacious, and which include calcium, barium, strontium, magnesium, and aluminum stearates, and palmitates, oleates and lauro-stearates. "Petroleum distillate" refers to that class of petroleum products that have a boiling point falling in the range between 60° C. and over 300° C., from gasoline to lubricating oil, inclusive, for example.

It has been found during my experiments that a suitable index must first be established by which to determine the anti-foaming characteristics of the finished and treated proteinaceous solution. Since most of my work has been applied to proteinaceous glues, I have therefore established a foam-index number computed in the following manner:

The weight of 500 milliliters of glue freshly mixed and whipped is divided by the weight of 500 milliliters of freshly mixed but unwhipped glue. In the preparation of whipped or foamed glue, the freshly mixed glue is whipped for ten minutes in a Hobart C-10 mixer using a wire whip at high speed. The quotient of that division, stated in whole numbers, is the index number that I have developed and will use hereinafter. For example, if the weight of a 500 milliliter of whipped glue is identical with the weight of 500 milliliters of unwhipped glue, the quotient stated in whole numbers is 100. If the quotient is less than 100, foaming is indicated in the degree that that quotient is less than 100. In certain anti-foamers employed, a whipped and treated glue was found to be heavier than a similar volume of unwhipped glue, in which case the index number was greater than 100, indicating that defoaming of the glue had occurred.

Ordinarily, protein glues are prepared by the manufacturer in dry form and shipped to the user, such as a plywood mill, where they are placed in usable condition by the addition of water, alkalies and other chemicals, according to the requirements of the glue desired. The dry mix is usually added to a substantial quantity of water and stirred for a period of time, the sodium hydroxide or other chemicals are added, and the mixture further stirred for an additional period of time. Of course, the manner in which these materials are combined may vary greatly but, nevertheless, foaming will normally occur, since no matter what mechanical means is employed to make the mix homogeneous, the agitation will invariably entrap air and form bubbles and foam. In the normal use of glue in plywood manufacture, further agitation and increased trouble from foaming occurs when the glue passes through rolls in a glue applicator machine.

Example I

| | Parts |
|---|---|
| Commercial soy bean protein glue (dry mix) | 100 |
| Water | 400 |
| Sodium hydroxide (33%) | 18 |
| Anti-foam material | 3 |

The dry mix is added to the water slowly and mixed mechanically for ten minutes. The sodium hydroxide is then added and mixing is continued for an additional ten minutes. Thereafter the anti-foam material is added and mixing carried on for one minute additional.

Various anti-foam materials were tested as set forth hereinafter. The anti-foam compositions were used in amounts equal to 3% by weight of the weight of the dry mix with the resultant index numbers, calculated as above described, indicated opposite the recited material, as shown below:

| Composition | Foam Index No. |
|---|---|
| Sodium stearate | 20 |
| No anti-foam | 22 |
| Kerosene | 22 |
| Fuel Oil | 23 |
| Calcium stearate and Diesel oil (ratio 1:5) | 28 |
| Calcium stearate (0.18%); pine oil (99.82%) | 29.5 |
| Calcium stearate and mineral oil (ratio 1:5) | 33 |
| Calcium stearate | 35 |
| Diesel oil and pine oil (ratio 1:1) | 36 |
| Pine oil | 68 |
| Calcium stearate (2.1%); pine oil (97.9%) (no heating) | 92 |
| Calcium stearate (1.67%); pine oil (98.33%) heated to 90° C. for 10 minutes | 96 |
| Calcium stearate (2.1%); pine oil (97.9%) heated to 160° C. for 10 minutes | 103 |
| Calcium stearate (6%); SAE #30 lubricating oil (27.3%); Pine oil (66.7%) | 105 |
| Calcium stearate (6%); stove oil (27.3%); Pine oil (66.7%) | 105 |
| Calcium stearate (6%); gasoline (27.3%); Pine oil (66.7%) | 109 |
| Calcium stearate (3%); mineral oil (13.7%); Pine oil (83.3%) heated to 90° C. 10 minutes | 110 |
| Magnesium, strontium or barium stearate (3%); fuel oil (13.7%); pine oil (83.3%) heated to 90° C. 10 minutes | 110 |
| Calcium stearate (3%); fuel oil (13.7%); pine oil (83.3%) heated to 90° C. for 10 minutes | 113 |

From the foregoing it will be seen that neither the petroleum distillates, such as kerosene or fuel oil, nor a combination of such distillates with pine oil, nor a combination of such distillates with an insoluble stearate, produced an effective anti-foam agent when mixed with glue in the manner described. Also it should be noted that the insoluble stearates alone are ineffective as anti-foamers. Sodium stearate aggravated the foam condition.

However, it clearly appears that desirable anti-foaming properties occur when an insoluble stearate is combined with pine oil and also with a combination of pine oil and a petroleum distillate.

The heating steps facilitate the combination of the stearate with the pine oil and petroleum distillate by facilitating the dispersion of the stearate in the vehicle. Other methods can be employed with equal success and without departing from the spirit of this invention, as long as a substantially homogeneous or uniform suspension of solution is produced. Such homogeneity facilitates the addition of the anti-foamer to the glue mix and insures uniform suspension or dispersion therein.

It is desirable that the heating step in the preparation of the anti-foamer should be limited to heating to a temperature below the boiling point of the petroleum distillate used.

Example II

| Parts | Composition | Minutes Mixed |
|---|---|---|
| 300 | Commercial soy bean dry mix glue | 10 |
| 9 | Anti-foamer (as below) | 10 |
| 600 | Water | 2 |
| 333 | do | 1 |
| 180 | 20% lime | 1 |
| 54 | 33% sodium hydroxide | 1 |
| 75 | sodium silicate (grade N) | |
| 5 | No. 12 solution (composed of carbon tetrachloride and carbon disulphide) | 8 |

The mixing order and time are according to the requirements of the glue manufacturer.

The following results were obtained with various anti-foamers as indicated by the index numbers:

| Composition | Foam Index Number |
|---|---|
| No antifoamer | 20 |
| Magnesium stearate (9%) and fuel oil (41%) and pine oil (50%) | 73 |
| Magnesium stearate (3%) and fuel oil (13.7%) and pine oil (83.3%) | 82 |
| Magnesium stearate (6%) and fuel oil (27.4%) and pine oil (66.6%) heated to 90° C. for ten minutes | 91 |
| Magnesium stearate (6%) and fuel oil (27.4%) and pine oil (66.6%) heated to 140° C. for ten minutes | 95 |

Example III

| Parts | Composition | Minutes Mixed |
|---|---|---|
| 300 | Commercial soy-bean-blood protein glue (dry mix) | 10 |
| 1,200 | Water | 8 |
| 54 | 33% sodium hydroxide | |

Note that the dry mix is added to the water and that following initial mixing, the sodium hydroxide is added, whereupon additional mixing follows.

Without an anti-foamer added, the foregoing glue had an index number of 21. With 9 parts by weight (3%) of anti-foamer to 300 parts (97%) dry mix of the glue, an index number of 95 resulted, where the anti-foamer consisted of calcium stearate (6%) and fuel oil (27.4%) and pine oil (66.6%). It is to be noted that substantial foam abatement was obtained with a treated glue, whereas with the same glue, non-treated, the mix included a substantial quantity of foam.

While the foregoing examples have been limited to foam prevention in plywood glues treated by the anti-foaming agents of this invention, it is to be understood that these examples are merely illustrative, and that it is not intended to thereby limit the anti-foaming agents described solely to plywood glues. It should be apparent that in fields where similar situations prevail in company with proteinaceous solutions, such as protein paints, protein plastics, fiber slurries containing proteinaceous sizing materials, and the like, the anti-foamers described will be effective and useful and within the scope and spirit of this invention.

From the foregoing examples it has been determined that ranges may be established for the various components of the various anti-foamers having desirable characteristics. For example, the ranges for the various constituents appear to be:

| | Per cent |
|---|---|
| Pine oil | 12.5 to 99.5 |
| Stearate | 0.5 to 12 |
| Petroleum distillate | 20 to 80 |
| Cup grease No. 2 | 20 to 80 |

The exact amounts vary with various combinations depending upon the particular formulation. The following sets forth the maximum and minimum amounts and the recommended formulation in the various combinations:

```
                                                        Per cent
1. Pine oil_____ 99.5% to 88   %; recommended_____ 98.5
   Stearate_____ 12.5% to  0.5 %; recommended_____  1.5
2. Pine oil_____ 87.5% to 20   %; recommended_____ 66.7
   Petroleum Distillate_ 80  % to 12.5 %; recommended_____ 27.3
   Stearate_____ 12  % to  0.75%; recommended_____  6
3. Pine oil_____ 87.5% to 20   %; recommended_____ 66⅔
   Cup Grease No. 2____ 80  % to 12.5 %; recommended_____ 33⅓
```

It will be readily apparent that the combination of an insoluble stearate and a petroleum distillate is most effectual in carrying out my invention and I have found an excellent and readily available source of such materials is cup-grease of the types commonly used in the automotive industry. Investigation has been made of a wide variety of such cup-greases and in all instances the soluble stearate and petroleum distillate were found to be present in desirable amount and, in certain instances insoluble stearate or calcium stearate.

Throughout this specification and claims the use of the word "glue refers" to a protein adhesive of the type of which soy bean meal glue and glues have related proteins therein, are examples. "Cup grease No. 2" is a standard product of the petroleum industry and comprises a combination of metallic soap and petroleum distillate that is highly water insoluble and is normally used to lubricate and seal water pumps. A suitable cup grease of this nature comprises approximately 16% calcium soap, 3% water, 2% ash and the balance, a petroleum oil. Standard specifications are to be found in Bulletin 25 (1931 Rev.) Kansas City Testing Laboratories, page 432, of the "Handbook of Petroleum, Asphalt and Natural Gas," by Roy Cross.

Having thus described my invention, I claim:

1. A composition for abating foam in proteinaceous dispersions and suspensions of adhesives, consisting of a dispersed mixture of an alkaline earth stearate, pine oil, and a petroleum distillate having a boiling point between that of gasoline and SAE No. 30 lubricating oil; in which mixture the stearate constitutes from about 1.0% to 12.0% by weight of the mixture, and the remainder of said mixture comprises pine oil and petroleum distillate in the ratio of at 1:1 to 7:1.

2. The composition according to claim 1 wherein the stearate is calcium stearate.

3. The composition according to claim 1 wherein the ratio of pine oil distillate is about 3:5.

4. The composition according to claim 1 wherein the stearate is calcium stearate employed in an amount equal to from 4% to 5% of the mixture.

5. A composition for abating foam in proteinaceous dispersions and suspensions of adhesives, consisting of a dispersed unheated mixture of an alkaline earth stearate, pine oil, and a petroleum distillate having a boiling point between that of gasoline and SAE No. 30 lubricating oil; in which mixture the stearate constitutes from about 1.0% to 12.0% by weight of the mixture, and the remainder of said mixture comprises pine oil and petroleum distillate in the ratio of about 1:1 to 7:1.

BERNARD B. COYNE.

REFERENCES CITED

The following references are of record in the file of this patent:

UNITED STATES PATENTS

| Number | Name | Date |
|---|---|---|
| 1,957,514 | Wolfson | May 8, 1934 |
| 2,304,102 | Maywood et al. | Dec. 8, 1942 |
| 2,351,109 | Corwin et al. | June 13, 1944 |
| 2,390,212 | Fritz | Dec. 4, 1945 |
| 2,433,783 | Paterek | Dec. 30, 1947 |

OTHER REFERENCES

Page 267 of "Casein and its Industrial Applications," by Sutermeister and Brown, 2nd edition (1939).